(12) United States Patent
Koh et al.

(10) Patent No.: US 10,916,752 B2
(45) Date of Patent: Feb. 9, 2021

(54) LITHIUM SECONDARY BATTERY AND MANUFACTURING METHOD THEREOF

(71) Applicants: Hyundai Motor Company, Seoul (KR); Kia Motors Corporation, Seoul (KR); The Industry & Academic Cooperation in Chungnam National University (IAC), Daejeon (KR)

(72) Inventors: KiSeok Koh, Gyeonggi-do (KR); Yeolmae Yeo, Gyeonggi-do (KR); Seung-Min Oh, Incheon (KR); Yoon Sung Lee, Gyeonggi-do (KR); Kyung Jin Lee, Daejeon (KR); Hyojin Kim, Daejeon (KR)

(73) Assignees: Hyundai Motor Company, Seoul (KR); Kia Motors Corporation, Seoul (KR); The Industry & Academic Cooperation in Chungnam National University (IAC), Daejeon (KR)

( * ) Notice: Subject to any disclaimer, the term of this patent is extended or adjusted under 35 U.S.C. 154(b) by 62 days.

(21) Appl. No.: 16/211,454

(22) Filed: Dec. 6, 2018

(65) Prior Publication Data

US 2019/0334150 A1    Oct. 31, 2019

(30) Foreign Application Priority Data

Apr. 30, 2018 (KR) .................. 10-2018-0049800

(51) Int. Cl.
*H01M 4/525* (2010.01)
*H01M 4/62* (2006.01)
(Continued)

(52) U.S. Cl.
CPC ......... *H01M 2/1653* (2013.01); *H01M 2/145* (2013.01); *H01M 2/1686* (2013.01); *H01M 10/0525* (2013.01); *H01M 2220/20* (2013.01)

(58) Field of Classification Search
CPC ............ H01M 2/16; H01M 2/14; H01M 2/12; H01M 10/0525
See application file for complete search history.

(56) References Cited

U.S. PATENT DOCUMENTS

| 4,278,741 A * | 7/1981 | Kalnoki-kis | ........ H01M 2/1673 429/48 |
| 2007/0099089 A1 * | 5/2007 | Miura | ............... H01M 10/0567 429/307 |

(Continued)

FOREIGN PATENT DOCUMENTS

| JP | 60-52 A | 1/1985 |
| JP | 2006-286311 A | 10/2006 |
| JP | 2009-114434 A | 5/2009 |

OTHER PUBLICATIONS

Lee et al., "Enhancement of Self-Healing Property by Introducing Ethylene Glycol Group into Thermally Reversible Diels-Alder Reaction Based Self-Healable Materials", Macromolecular Research, 25(6), 640-647 (2017).

(Continued)

*Primary Examiner* — Kenneth J Douyette
(74) *Attorney, Agent, or Firm* — Mintz Levin Cohn Ferris Glovsky and Popeo, P.C.; Peter F. Corless

(57) ABSTRACT

Disclosed is a lithium secondary battery provided with a separator, having improved thermal stability by including a micro-particle coating layer manufactured using Furan-based polymers, for example, polymers having polymer unit including furanyl or furoyl. The lithium secondary battery includes a cathode, an anode, an electrolyte, and a separator disposed between the cathode and the anode and including a coating layer including a micro-particle. The micro-particle includes the second polymer which may include cross-linked first polymer.

7 Claims, 4 Drawing Sheets

(51) Int. Cl.
*H01M 10/0568* (2010.01)
*H01M 2/16* (2006.01)
*H01M 10/0525* (2010.01)
*H01M 2/14* (2006.01)

(56) References Cited

U.S. PATENT DOCUMENTS

2007/0218371 A1* 9/2007 Elliott ............... H01M 10/0565
    429/307
2012/0202104 A1  8/2012 Han et al.
2017/0200932 A1* 7/2017 Sasaki ............... H01M 10/0525

OTHER PUBLICATIONS

Jo et al., "Thermally reversible self-healing polysilsesquioxane structure-property relationships based on Diels-Alder chemistry", Polymer 108 (2017) 58-65.

* cited by examiner (a)　　　　　　　　(b)

LITHIUM SECONDARY BATTERY AND MANUFACTURING METHOD THEREOF

CROSS-REFERENCE TO RELATED APPLICATION(S)

This application claims priority to and the benefit of Korean Patent Application No. 10-2018-0049800, filed on Apr. 30, 2018 in the Korean Intellectual Property Office, the disclosure of which is incorporated by reference in its entirety.

TECHNICAL FIELD

The present invention relate to a lithium secondary battery and a method of manufacturing the same.

BACKGROUND

In general, a lithium secondary battery including an electroactive material has a high operating voltage and high energy density compared to a lead-acid battery or a nickel/cadmium battery. Accordingly, the lithium secondary battery has been widely used as energy storage devices for an Electric Vehicle (EV) and a Hybrid Electric Vehicle (HEV).

A separator of the lithium secondary battery includes a polymer material having fine pores, and it serves to prevent an electrical short between an anode and a cathode, and also serves to close the pores of the separator when the internal overheating occurs, and stop the battery operation, called a shutdown function.

SUMMARY

In preferred aspects, the present invention provides a lithium secondary battery having improved thermal stability. The lithium secondary battery preferably may include a separator including a micro-particle coating layer made of a Furan-based polymer.

Additional aspects of the disclosure will be set forth in part in the description which follows and, in part, will be obvious from the description, or may be learned by practice of the disclosure.

In an aspect of the present invention, a lithium secondary battery may include: a cathode; an anode; an electrolyte; and a separator disposed between the cathode and the anode and comprising a coating layer comprising a polymer admixture which comprise (e.g. be in, or be in the form of) a micro-particle. The polymer mixture may include a second polymer that may include a cross-linking structure of a first polymer comprising reacted (i.e. polymerized) monomers containing one or more furoyl groups.

Preferably, the first polymer may include reacted (i.e. polymerized) furoyl ether ethyl methacrylate (FEEMA) monomers cross-linked by a first cross-linking agent. The first cross-linking agent may suitably be ethylene glycol dimethacrylate.

The polymers, i.e., the first polymer and the second polymer, as used herein may include repeating or random arrays of polymer units or monomers, each of which independently may include at least one or more furanyl group, furoyl group, ether, alkylene (e.g., methylene or ethylene) and/or methacrylates. In certain preferred embodiments, the first and second polymers (sometimes referred to herein without limitation as "first FEEMA polymer" and "second FEEMA polymer") may include polymer units or monomers comprising furoyl ether ethyl methacrylate (FEEMA) in an amount of about 10 mole % or greater, about 20 mole % or greater, about 30 mole % or greater, about 40 mole % or greater, about 50 mole % or greater, about 60 mole % or greater, about 70 mole % or greater, about 80 mole % or greater, about 90 mole % or greater, about 95 mole % or greater, or about 99 mole % or greater of the total number of the monomers. For example, the monomers of the first polymer and the second polymer may further suitably include at least one methacrylate groups. The monomers of the first polymer and the second polymer may further suitably at least one alkylene groups. The monomers of the first polymer and the second polymer may further suitably include at least one ether groups.

As a representative example, polymeric microparticles in this invention may be prepared using desired amount of FEEMA polymers with twice molar amount of Bismaleimide for their calculated Furan moiety in Poly(FEEMA).

The first polymer may include a first cross-linking structure including ethylene glycol dimethacrylate.

The term "cross-linking structure" as used herein refers to a structure making a bridge between at least two or more monomers. The cross-linking structure may be suitably formed by reactive groups contained in the monomers, or alternatively, may be suitably formed by separate cross-linker additive compounds. Examples of the cross-linker additive to form the polymer may include ethylene glycol (e.g., ethylene glycol dimethacrylate), bismaleimide (e.g., 1,1'-(Methylenedi-1,4-phenylene) bismaleimide) or the like.

The first polymer may suitably include the first cross-linking agent in an amount of about 1 mol % or greater and about 5 mol % or less based on the total moles of the FEEMA monomers and the first cross-linking agent.

The second polymer may suitably include a second cross-linking agent. For example, the second cross-linking agent may be bismaleimide.

Preferably, the second cross-linking agent may cross-link the first polymer to form the second polymer.

In another aspect of the present invention, a method of manufacturing a lithium secondary battery may include: preparing a polymer admixture comprising a second polymer comprising a cross-linking structure of a first polymer comprising monomers containing one or more furoyl groups; preparing a coating composition comprising the polymer admixture; and applying the coating composition to a separator, to thereby manufacture the separator comprising the polymer admixture composition.

The polymer admixture suitably may comprise or be in the form of polymeric micro-particles.

The first polymer may include furoyl ether ethyl methacrylate (FEEMA) monomers cross-linked by a first cross-linking agent. For example, the first cross-linking agent may be ethylene glycol dimethacrylate.

The first polymer may include the first cross-linking agent in an amount of about 1 mol % or greater and about 5 mol % or less based on the total moles of the FEEMA monomers and the first cross-linking agent.

The preparing of the polymer admixture (e.g. micro-particles) may include reacting the first polymer with a second cross-linking agent in a molar ratio of about 1:1. For example, the second cross-linking agent may be bismaleimide.

The preparing of a preferred coating solution may include admixing the micro-particles and a dispersion solution including a binder and a surfactant.

The manufacturing of the separator may further include: drying the separator coated with the coating solution.

As referred to herein, the term micro-particle refers to a polymeric admixture that suitably may have a dimeter (or longest dimension) of for example 0.01 to 500 microns, more typically 0.01 to 250 microns, or 0.01 to 2, 5, 10, 20, 30 40, 50, 60, 70, 80, 90, 100, 120 or 150 microns.

Further provided is a vehicle that may include the lithium secondary batter as described herein.

Other aspects of the invention are disclosed infra.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
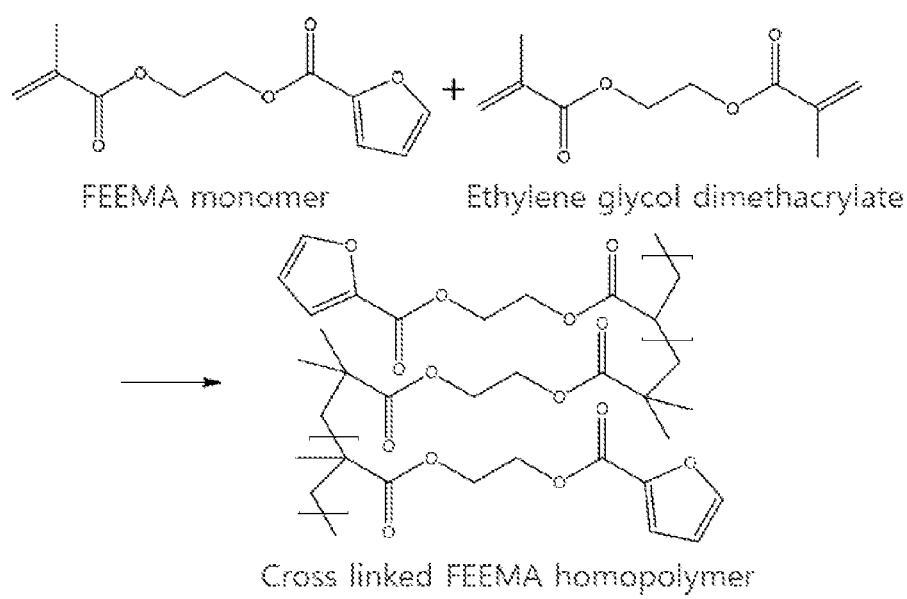
FIG. 1 shows an exemplary cross-linking structure of an exemplary first FEEMA polymer.

Like numbers refer to like elements throughout this specification. This specification does not describe all components of the embodiments, and the general information in the technical field to which the present disclosure belongs or the overlapping information between the embodiments will not be described.

Like reference numbers refer to like elements throughout the description of the figures. In the drawings, the sizes of structures are exaggerated for clarity. It will be understood that, although the terms "first", "second", etc. may be used herein to describe various elements, these elements should not be limited by these terms and are used only to distinguish one element from another. For example, within the scope defined by the present invention, a first element may be referred to as a second element and similarly, a second element may be referred to as a first element. Singular forms are intended to include plural forms as well, unless context clearly indicates otherwise.

It will be further understood that the terms "comprises", "has" and the like, when used in this specification, specify the presence of stated features, number, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" modifies all the numbers, figures and/or expressions. In addition, when numerical ranges are disclosed in the description, these numerical ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include figures such as 10%, 11%, 12% and 13%, as well as 30%, and any sub-ranges of 10% to 15%, 12% to 18%, or 20% to 30%, as well as any figures, such as 10.5%, 15.5% and 25.5%, between appropriate integers that fall within the range.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, preferred embodiments of the present invention will be described in detail with reference to the accompanying drawings and tables. For example, a lithium secondary battery will be described, and then a separator according to various embodiments will be described.

Generally, a lithium secondary battery includes a cathode, an anode, a separator, and an electrolyte. The cathode, the anode, and the separator forming an electrode structure may be implemented using components typically used to manufacture a lithium secondary battery.

An electrode may include an electrode active material and a binder. For example, the electrode according to exemplary embodiments may be formed by applying a predetermined thickness of an electrode slurry having a mixture of an electrode active material, a binder and solvent, and a conductive material to an electrode current collector, and then drying the electrode slurry and rolling the electrode.

An anode active material which is used to manufacture the anode may be provided using any anode active material that can insert and extract lithium ions. The anode active material may include at least one selected from the group consisting of a material capable of reversibly absorbing and extracting lithium ions, a metal material forming an alloy with lithium, mixtures thereof, or a combination thereof.

The material capable of reversibly absorbing and extracting lithium ions may be at least one material selected from the group consisting of synthetic graphite, natural graphite, graphitized carbon fiber, graphitized mesocarbon microbeads (MCMB), fullerene, and amorphous carbon.

The amorphous carbon may be hard carbon, coke, MCMB and mesophase pitch-based carbon fiber (MPCF) sintered at a temperature of 1500° C. or lower, or the like. Also, the metal material capable of forming an alloy with lithium may be at least one metal selected from the group consisting of Al, Si, Sn, Pb, Zn, Bi, In, Mg, Ga, Cd, Ni, Ti, Mn, and Ge. The metal materials may be used alone, in combination, or in an alloy. Also, the metal may be used as a compound mixed with a carbon-based material.

According to an exemplary embodiment, the anode active material may include a graphite-based anode active material and a composite of a graphite-based anode active material and a silicon (Si)-based anode active material.

The Si-based anode active material includes silicon oxide, silicon particles, silicon alloy particles, and the like. Representative examples of the alloy include a solid solution of aluminum (Al), manganese (Mn), iron (Fe), titanium (Ti), and the like, with a silicon element, an intermetallic compound, an eutectic alloy, and the like, but the alloys according to the present inventions are not limited thereto.

The binder according to an exemplary embodiment may be provided using a water-based binder such as carboxymethyl cellulose (CMC)/styrene-butadiene rubber(SBR) used in a graphite-based anode. When the anode includes a graphite and silicon composite, the binder may include a binder in which a water-based binder such as CMC/SBR used in a graphite-based anode for improving the adhesion is mixed with a polymer binder such as heparin, Dopamine-polymerized heparin and lithium polyacrylates (LiPAA for increasing the adhesion strength of a silicon-based anode and suppressing the volume expansion of the silicon-based anode.

A cathode active material in the cathode according to an exemplary embodiment may include a compound allowing reversible intercalation and deintercalation of lithium. For example, the cathode active material may be at least one type of a compound oxide of lithium and a metal selected from the group consisting of cobalt, manganese, nickel, and a combination thereof.

The electrode according to the embodiment may further include other additives, such as a dispersion medium, a conductive material, a viscosity modifier, and a filling material, in addition to the electrode active material and the binder described above.

The separator may prevent a short circuit between the cathode and the anode, and provide a passage of lithium ions. The separator may be a polyolefin-based polymer film including polypropylene, polyethylene, polyethylene/polypropylene, polyethylene/polypropylene/polyethylene, and polypropylene/polyethylene/polypropylene or a multilayer film thereof, a microporous film, fabric, and non-woven fabric, which are well-known in the related art. Also, a microporous polyolefin film coated with a resin having high stability may be used for the separator. When the electrolyte is provided using a solid electrolyte such as a polymer, the solid electrolyte may function as the separator.

The separator closes the pores of the separator when the internal overheating occurs and stops the battery operation. The separator according to exemplary the embodiment may not be swollen in an electrolyte at a temperature of 80° C. or less, and a cross-linking structure of the separator may be disassembled by the Retro Diels-Alder reaction at a temperature of about 115° C. to perform a shutdown function. Details thereof are described later.

The electrolyte may include lithium salt and a non-aqueous organic solvent, and may further include an additive for improving the charging/discharging characteristics and preventing overcharging. The lithium salt may be, for example, a mixture of one or more materials selected from the group consisting of $LiPF_6$, $LiBF_4$, $LiClO_4$, LiCl, LiBr, LiI, $LiB_{10}Cl_{10}$, $LiCF_3SO_3$, $LiCF_3CO_2$, $LiAsF_6$, $LiSbF_6$, $LiAlCl_4$, $CH_3SO_3Li$, $CF_3SO_3Li$, $LiN(SO_2C_2F_5)_2$, $Li(CF_3SO_2)_2N$, $LiC_4F_9SO_3$, $LiB(C_6H_5)_4$, $Li(SO_2F)_2N$ (LiFSI) and $(CF_3SO_2)_2NLi$.

The non-aqueous organic solvent may be carbonate, ester, ether, or ketone, which can be used alone or in combination. The carbonate may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), fluoroethylene carbonate (FEC), vinylene carbonate (VC), etc., the ester may be γ-butyrolactone (GBL), n-methyl acetate, n-ethyl acetate, n-propyl acetate, etc., and the ether may be dibutyl ether, although not limited to these.

Also, the non-aqueous organic solvent may further include an aromatic hydrocarbon organic solvent. Examples of the aromatic hydrocarbon organic solvent may be benzene, fluorobenzene, bromobenzene, chlorobenzene, cyclohexylbenzene, isopropyl benzene, n-butylbenzene, octyl benzene, toluene, xylene, mesitylene, and the like, which can be used alone or in combination.

Hereinafter, the separator of the lithium secondary battery according to the embodiment will be described in detail. In the following description, the unit is represented by weight % (wt %), unless indicated otherwise specifically noted.

The anode according to the embodiment includes a coating layer having micro-particles on a surface thereof. The micro-particles may have a cross-linking structure of a polymer containing a furan functional group, for example, a cross-linking structure of furoyl ether ethyl methacrylate (hereinafter referred to as FEEMA).

FIG. 1 shows an exemplary cross-linking structure of an exemplary first FEEMA polymer. As shown in FIG. 1, a FEEMA polymer may react with ethylene glycol dimethacrylate, which is a first cross-linking agent, to form a first FEEMA polymer having a first cross-linking structure.

The FEEMA polymer may be polymerized through free radical polymerization with ethylene glycol dimethacrylate serving as a first cross-linking agent, and the degree of cross-linking may be controlled according to the mole percent (mol %) of the first cross-linking agent based on the total moles of the FEEMA monomers and the first cross-linking agent for polymerization. The degree of cross-linking may be controlled by the mole percent (mol %) of ethylene glycol dimethacylate, which acts as a cross-linking agent.

When a FEEMA polymer, which does not contain a cross-linking agent, is prepared as a film-shaped specimen, and is impregnated with an electrolytic solution for 5 hours at the temperature of about 80° C., the shape of the specimen, may be broken by swelling. However, when the first cross-linking agent is contained in an amount of about 1 mol % or greater and 10 mol % or less based on the total moles of the FEEMA monomers and the first cross-linking agent, the FEEMA polymer in the form of a film may maintain its shape even after it was left in the electrolytic solution for 5 hours at a temperature of about 80° C. In other words, through the formation of the first cross-linking structure by the addition of the first cross-linking agent, swelling by the electrolytic solution may be suppressed. The above-mentioned suppression of swelling by the first cross-linking structure may lead to improvement of the shape retention ability of the micro-particles containing a second FEEMA polymer which will be described later. Meanwhile, when the first cross-linking agent is contained in an amount of 10 mol %, the first FEEMA polymer may not dissolve in chloroform due to the high degree of cross-linking of the first FEEMA polymer and thus the production of the micro-particles may be difficult. Accordingly, the first cross-linking agent may be preferably contained in an amount of about 1 mol % or greater and about 5 mol % or less.

Figure 2:
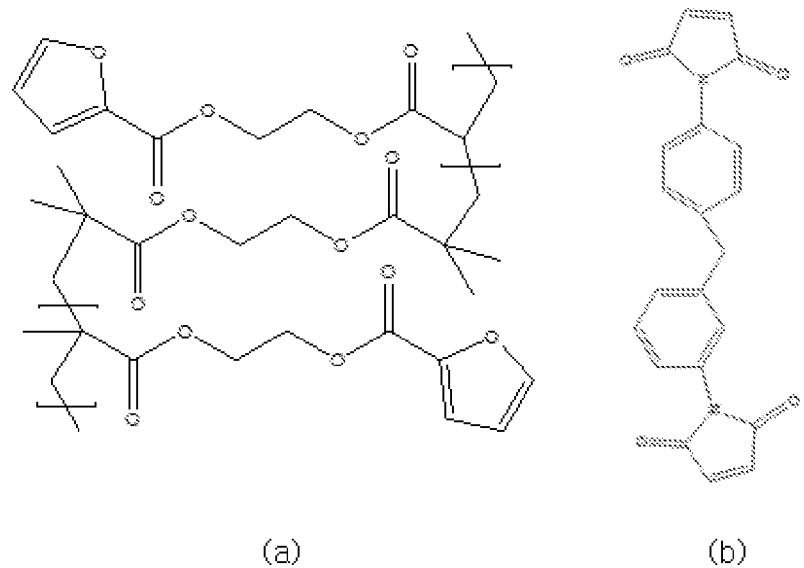
FIG. 2 shows an exemplary structure of an exemplary first FEEMA polymer and an exemplary second cross-linking agent for the production of micro-particles according to an exemplary embodiment of the present invention.

FIG. 2 shows an exemplary structure of an exemplary first FEEMA polymer and an exemplary second cross-linking agent for production of exemplary micro-particles according to an exemplary embodiment of the embodiment.

As shown in FIG. 2, the second FEEMA polymer may have a second crosslinking structure by a reaction of the first FEEMA polymer (a) and a bismaleimide-based crosslinking agent (b), which is the second cross-linking agent. A furan group of the first FEEMA polymer and a maleimide group of the second cross-linking agent undergo a Diels-Alder reaction to crosslink the first FEEMA polymer. 1,1'-(Methylenedi-1,4-phenylene) bismaleimide may be used as the bismaleimide-based crosslinking agent, which is the second crosslinking agent.

The polymer admixture which may be in the form of micro-particles according to an exemplary embodiment may include a second FEEMA polymer having a second cross-linking structure arising from a cross-linking between the first FEEMA polymer and the second cross-linking agent. The cross-linking structure of the second FEEMA polymer may be disassembled by a retro Diels-Alder reaction at a temperature of about 115° C.

The polymer admixture which may be in the form of micro-particles containing the second FEEMA polymer described above may be coated on the surface of the separator to form a coating layer. The polymer admixture (suitably micro-particles) coating layer has the cross-linking structure thereof dissembled by the above-mentioned retro Diels-Alder reaction at a temperature of about 115° C. and, as consequence, may close the pores of the separator, thereby performing a shutdown function.

Figure 3:
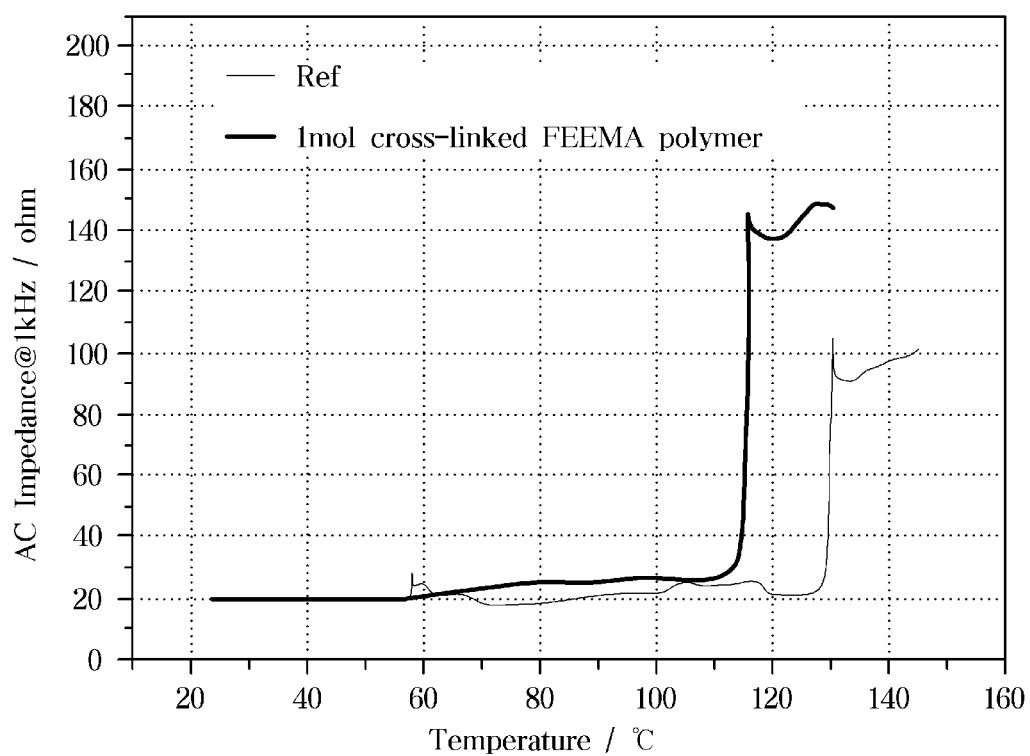
FIG. 3 shows a shutdown temperature of an exemplary separator including exemplary micro-particles according to an exemplary embodiment of the present invention.

FIG. 3 shows shutdown temperature of the separators according to an exemplary embodiment.

A reference separator shown in FIG. 3 is a ceramic coated separator, and the separator according to an exemplary embodiment is a separator including an exemplary micro-particle coating layer containing an exemplary first cross-linking agent in the amount of 1 mol %. A pouch type cell was fabricated by using each of the above-described reference separator and the separator according to an exemplary embodiment, and the temperature was measured with a thermocouple for temperature measurement attached to the center of the pouch cell.

The pouch cell was put into a convection oven, with a terminal of the pouch cell connected to a 1 kHz impedance meter, and the resistance of the pouch cell was measured by setting a temperature rising rate of the oven to 2° C./min and increasing the oven temperature. As shown in FIG. 3, from the temperatures of the thermocouples attached to the pouch cells and impedance measurement values, a graph of impedance resistance according to temperature was obtained. As shown in FIG. 3, a temperature range in which the resistance value rapidly rises due to the shutdown characteristic of the separator was confirmed, and the shutdown temperature of the pouch cell to which the separator according to an exemplary embodiment was applied was 115° C. In a meantime, the shutdown temperature of the pouch cell to which the reference separator was applied was 130° C. In other words, the shutdown temperature of the separator according to the disclosed embodiment is reduced from the 130° C. to 115° C., so that the shutdown function may be activated early at high temperature, thereby ensuring the stability of the battery cell.

Figure 4:
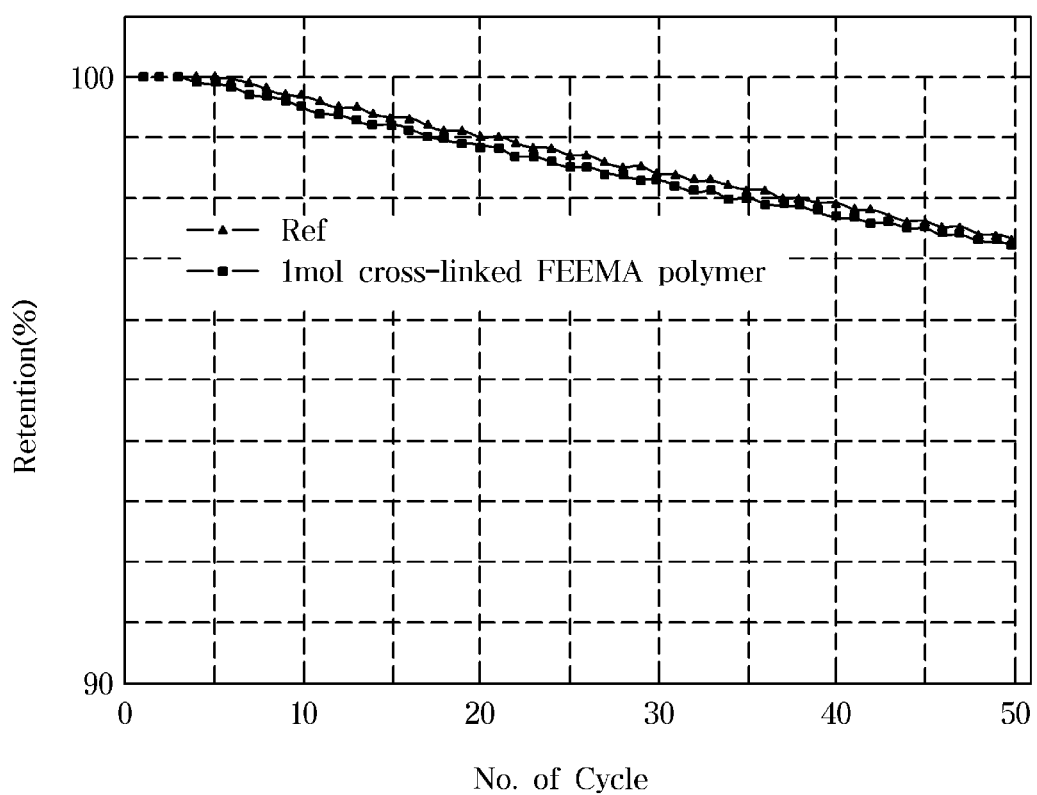
FIG. 4 shows a result of charge/discharge test of an exemplary separator according to an exemplary embodiment of the present invention.

FIG. 4 shows the result of charge/discharge test of the separator according to an exemplary embodiment. A coin cell type half-cell was fabricated by applying each of the above-described reference separator and the separator coated with the micro-particles according to the embodiment. Discharge capacity data according to the number of cycles was obtained through charger/discharge using the charge/discharge device of the coin cell, a discharge capacity retention rate (based on the first discharge capacity) according to the charge/discharge cycle was obtained from the discharge capacity data, and the charge/discharge life characteristics of the reference separator and the separator according to an exemplary embodiment were compared. As shown in FIG. 4, even when the separator according to an exemplary embodiment was used, the charge/discharge life characteristics had no large difference compared with the case of using the reference separator. In other words, the cell performance may not be deteriorated by the micro-particle coating.

Hereinafter, a method for manufacturing micro-particles, and a method for manufacturing a separator coated with the micro-particles according to the embodiments are described.

Example 1

According to an exemplary embodiment, a first solution mixed with of 15% mixed with Gum Arabic of 4.5 g and $H_2O$ of 30 g was prepared, a second solution mixed with a first FEEMA polymer of 0.17 g, chloroform of 0.75 ml, 1,1'-(Methylenedi-1,4-phenylene) bismaleimide of 0.136 g and chloroform of 1.0 ml was prepared. The first FEEMA polymer and bismaleimide were mixed at a molar ratio of 1:1. The first solution in an amount of 12 ml was put into a 50 ml flask, and then the second solution was put into the flask in which the second solution was put into. Isophorone diisocyanate (IPDI) in an amount of 0.5 ml was further added to the flask. The flask was sealed and a reaction is carried out at a temperature of 60° C. and spanned at 800 rpm for 24 hours on a hot plate. After completion of the reaction, washing was performed with ethanol and $H_2O$, so that micro-particles were produced.

Example 2

According to an exemplary embodiment, a separator was prepared using the micro-particles prepared. Ultrapure water and a SBR binder were mixed to produce a 3 wt % dispersion solution. Pluronic F-127, a surfactant, in an amount of 50% by weight of the SBR binder was added to the dispersion solution. The micro-particles were added to the dispersion solution to reach 10% of a solid content of the micro-particles, thereby preparing a coating solution. The coating solution was applied onto a PE separator using a spray gun. The separator coated with the coating composition was dried at a temperature of 60° C. inside an oven for 12 hours, and thus a coated separator was obtained.

The micro-particles coated on the separator according to various exemplary embodiments may undergo a retro-Diels-Ader reaction at a high temperature of 100° C. or greater to close the pores of the separator, thereby preventing the fire and explosion of the battery.

Although preferred embodiments of the present invention have been shown and described, it would be appreciated by those skilled in the art that changes may be made in these embodiments without departing from the principles and spirit of the disclosure, the scope of which is defined in the claims and their equivalents.

What is claimed is:

1. A lithium secondary battery comprising:
   a cathode;
   an anode;
   an electrolyte; and
   a separator disposed between the cathode and the anode and comprising a coating layer comprising a polymer admixture,
   wherein the polymer admixture comprises a second polymer comprising a cross-linking structure of a first polymer comprising reacted monomers containing one or more furoyl groups, and wherein the first polymer comprises reacted furoyl ether methacrylate (FEEMA) monomers cross-linked by a first cross-linking agent.

2. The lithium secondary battery of claim 1, wherein the polymer admixture comprises a micro-particle.

3. The lithium secondary battery of claim 2, wherein the first cross-linking agent is ethylene glycol dimethacrylate.

4. The lithium secondary battery of claim 1, wherein the first polymer comprises the first cross-linking agent in an amount of about 1 mol % or greater and about 5 mol % or less based on the total moles of the FEEMA monomers and the first cross-linking agent.

5. The lithium secondary battery of claim 1, wherein the second polymer comprises a second cross-linking agent.

6. The lithium secondary battery of claim 5, wherein the second cross-linking agent is bismaleimide.

7. A vehicle comprising a lithium secondary battery of claim 1.

* * * * *